W. M. BROOKS.
GARMENT TAG SEAL.
APPLICATION FILED MAY 14, 1915.
1,152,142.
Patented Aug. 31, 1915.
2 SHEETS—SHEET 2.
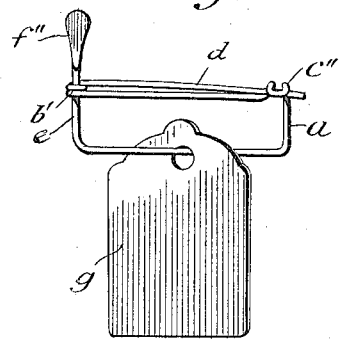
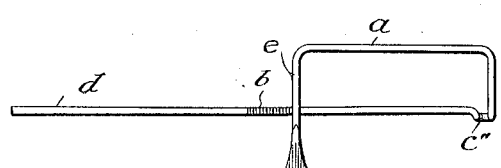
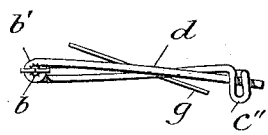
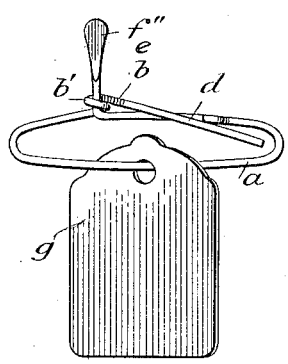
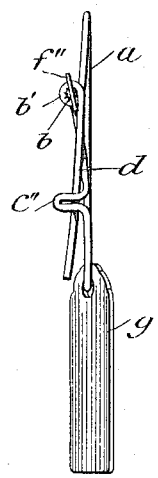
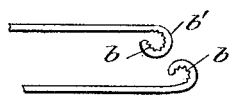

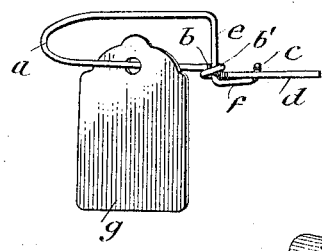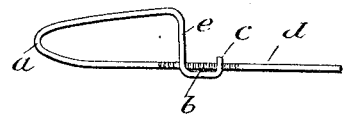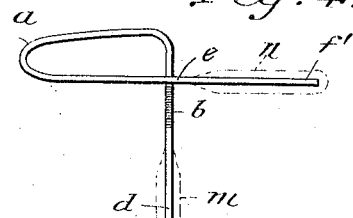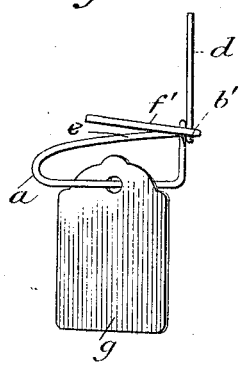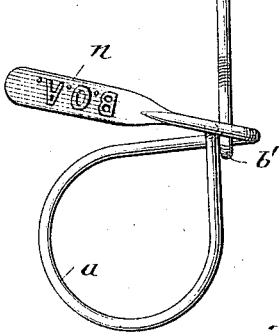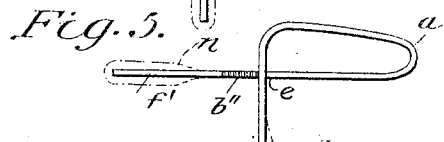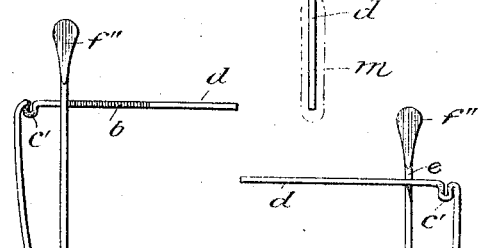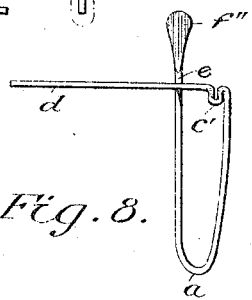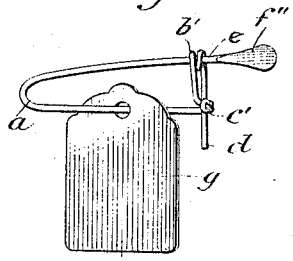

UNITED STATES PATENT OFFICE.

WINFRED MUDGE BROOKS, OF EAST ORANGE, NEW JERSEY, ASSIGNOR TO E. J. BROOKS & CO., OF NEW YORK, N. Y., A CORPORATION OF NEW YORK.

GARMENT-TAG SEAL.

1,152,142.  Specification of Letters Patent.  Patented Aug. 31, 1915.

Application filed May 14, 1915. Serial No. 28,062.

*To all whom it may concern:*

Be it known that I, WINFRED MUDGE BROOKS, a citizen of the United States of America, and a resident of East Orange, in the State of New Jersey, have invented a new and useful Improvement in Garment-Tag Seals, of which the following is a specification.

The object of this invention is to provide a simple inexpensive and effective means for attaching price and identification tags to garments, etc., so that removal of same will be impossible without detection.

The invention consists in a simple wire fastener adapted to attach the tag to the garment, capable of being easily applied and effectively sealed without tools, secure against accidental unsealing and so constructed that any attempt to unseal or remove must result in destroying the fastener.

Two sheets of drawings accompany this specification as part thereof, in which like reference characters denote like parts throughout.

Figures 1 and 2 show an outer-guard type of the device sealed and unsealed respectively; Fig. 3 shows a side view of a type having a seal-withdrawal-preventing feature, sealed, side views of the same type unsealed being shown in Figs. 4 and 5 and a modification of the same with flattened embossed portions being shown in Fig. 6; Fig. 7 shows an inner-guard type sealed, side view, the same seal being shown unsealed in front and back views in Figs. 8 and 9 respectively and an end view sealed in Fig. 10; Figs. 11 and 13 show side views of another type of inner-guard seal, sealed and unsealed respectively and an end view of the same type sealed is shown in Fig. 12; Figs. 14 and 16 show side and top views respectively of another type of inner-guard seal, sealed while a side view of the same unsealed is shown in Fig. 15; Fig. 17 shows the fractured seal parts of the improved tag-seal as effected by any attempt to tamper with the device after sealing.

Referring to the drawings, $a$ in each of the figures indicates the fastener or main loop, $e$ represents the seal core, so designated as being the part about which the sealing coil is wound and limited to that part of the wire within the coil, $d$ indicates the sealing shank provided with a plurality of transverse cut nicks $b$ in its side, $c$ in Figs. 1 and 2 $c'$ in Figs. 7, 8, 9 and 10 and $c''$ in Figs. 11, 12, 13, 14, 15 and 16 represent guards consisting of a loop or bend of the wire perpendicular to the main or fastening loop and adapted to protect the sealing shank $d$ from accidental disturbance; $f$ in Figs. 1 and 2, $f'$ in Figs. 3, 4, 5 and 6 and $f''$ in the remaining figures indicate means for preventing the withdrawal of the seal core $e$ from the sealing coil $b'$. The form $f$ Fig. 1 shows the utilization of the guard $c$ for the purpose; form $f'$ Figs. 3 4 and 5 utilizes the extremity of the seal core end of the loop which is provided with transverse nicks $b''$ in Fig. 5 on the outer side of the seal core similar to the cut notches in the sealing shank and in operation is bent back over the sealing coil as hereinafter more fully set forth; form $f''$ in the remaining figures consists in flattening and broadening the extremity of the seal core end of the loop as shown.

$g$ throughout represents the garment tag to be attached.

$m$ and $n$ indicate flattened and embossed portions of the loop for purposes of identification.

As the fastener-seal leaves the factory it consists essentially of a loop of suitable wire the ends of which cross each other at approximately right angles. One of the ends $d$ called the sealing shank is provided on one side adjacent to the other or seal core end $e$ at the approximate point of crossing with a plurality of transverse cut notches $b$ and is adapted to be coiled about said seal core forming a locking and sealing coil having the said transverse cut notches on its inner side and fitting snugly about said seal core. The outer end of the seal core is provided with withdrawal-preventing means $f$, $f'$ or $f''$ as hereinbefore set forth which coöperate with the seal coil to produce an effective fastening. The seal core end of the loop is further provided with a small hook or loop perpendicular to the main or fastening loop and adapted to serve as a catch and guard for the sealing shank after the sealing operation protecting it against accidental disturbance. This guard may be on the outer end of the seal core as shown at c Fig. 1 or on the inner side of the seal core as shown at c' Fig. 7 or c'' in Fig. 11.

In operation the tag is strung on the loop a and the fastener is then hooked through a buttonhole or the cloth of the garment. The sealing shank d is then bent toward the notches b and around the seal core e adjacent thereto forming a snug coil with the cut notches innermost. Upon the completion of the coil the sealing shank is snapped over the guard c, c' or c'' as the case may be. With the type of seal shown in Fig. 3 the end of the seal core is then bent toward its notches back over the sealing coil thus forming an effective sealed withdrawal-preventing part. Any attempt to remove by unbending or uncoiling the loop results in fracturing the same at one of the transverse notches as shown in Fig. 17.

Portions of the loop may be flattened and suitably embossed as indicated by m and n in Figs. 3, 4 and 5, and the seals may be serially numbered if desired to prevent substitution. Other modifications will readily suggest themselves to those skilled in the art.

Having thus fully described my invention, I claim:—

1. A garment tag seal having in combination a loop of suitable wire, a seal core portion integral with one end thereof, a sealing shank integral with the other end and crossing said seal core at approximately right angles, transverse cut notches in the side of the sealing shank adjacent to and facing the seal core, said sealing shank being adapted to be coiled around said seal core bringing said notches on the inner side of the sealing coil thus formed, means for preventing the withdrawal of said sealing coil from said seal core and a guard element for protecting said sealing shank from accidental unbending after sealing.

2. A garment tag seal having in combination a loop of suitable wire, a seal core portion integral with one end thereof, a sealing shank integral with the other end and crossing said seal core at approximately right angles, transverse cut notches in the side of the sealing shank adjacent to and facing the seal core, said sealing shank being adapted to be coiled around said seal core bringing said notches on the inner side of the sealing coil thus formed, and a continuation of the loop wire beyond said seal core having notches cut in its side adjacent to said core and being adapted to be bent back toward said notches and over the seal coil to prevent withdrawal of the latter protecting the sealing shank from accidental unbending after sealing.

3. A garment tag seal having in combination a loop of suitable wire, a seal core portion integral with one end thereof, a sealing shank integral with the other end and crossing said seal core at approximately right angles, transverse cut notches in the side of the sealing shank adjacent to and facing the seal core, said sealing shank being adapted to be coiled around said seal core bringing said notches on the inner side of the sealing coil thus formed, a flattened and broadened portion adjacent to and integral with the outer end of the seal core and constituting one extremity of the loop wire adapted to prevent the withdrawal of the sealing coil therefrom, and a guard element for protecting the sealing coil from accidental unbending after sealing.

4. A garment tag seal having in combination a loop of suitable wire, a seal core portion integral with one end thereof, a sealing shank integral with the other end and crossing said seal core at approximately right angles, transverse cut notches in the side of said sealing shank adjacent to and facing the seal core, said sealing shank being adapted to be coiled around said seal core bringing said notches on the inner side of the sealing coil thus formed, a continuation of the seal core at right angles thereto and integral therewith terminating in a catch perpendicular to the plane of the seal loop, said continuation and catch being adapted to prevent withdrawal of the sealing coil from the seal core and to protect the sealing shank from accidental unbending when snapped over said catch after sealing.

5. A garment tag seal having in combination, a loop of suitable wire, a seal core portion integral with one end thereof a sealing shank integral with the other end and crossing said seal core at approximately right angles, transverse cut notches in the side of said sealing shank adjacent to and facing said seal core, said sealing shank being adapted to be coiled around said seal core bringing said notches on the inner side of the sealing coil thus formed, a small loop perpendicular to the main seal loop and integral therewith, suitably located between the seal core and the sealing shank adapted to engage the end of said shank after sealing and protect same from accidental unbending, and a flattened and broadened portion adjacent to and integral with the outer end of the seal core to prevent withdrawal of the sealing coil.

6. A garment tag seal having in combination, a loop of suitable wire, a seal core portion integral with one end thereof, a sealing shank integral with the other end and crossing said seal core at approximately right angles, transverse cut notches in the side of said sealing shank adjacent to and facing said seal core, said sealing shank being adapted to be coiled around said seal core bringing said notches on the inner side of the sealing coil thus formed, a small loop perpendicular to the main seal loop and integral therewith located between the seal core and the sealing shank adapted to engage the end of the sealing shank after sealing and protect same from accidental unbending, and means for preventing the withdrawal of the sealing coil from the seal core.

WINFRED MUDGE BROOKS.

Witnesses:
ROSSLYN JAMOUNEAN,
MORRIS MICHELSON.